Feb. 4, 1936. C. C. FUERST 2,029,918
CAMERA CONSTRUCTION
Original Filed April 25, 1934
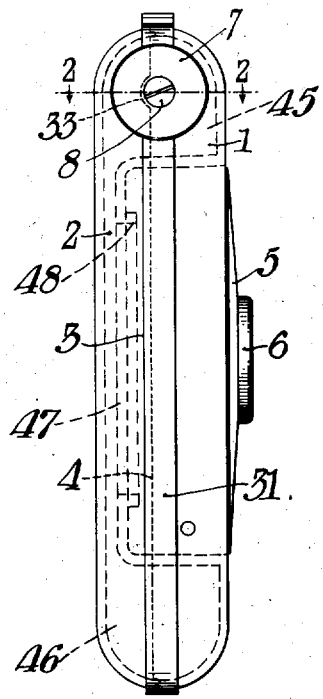
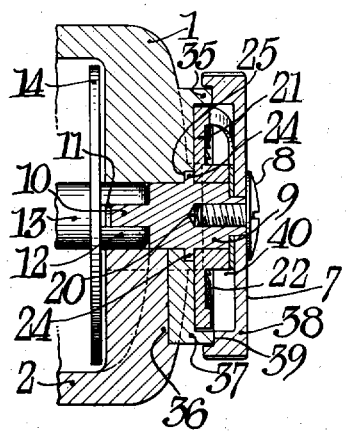
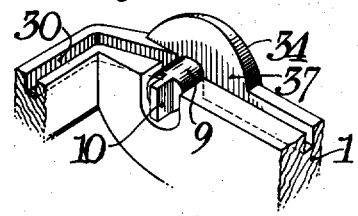
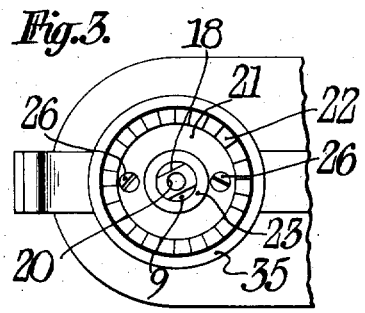
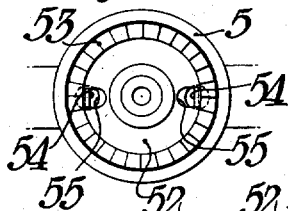
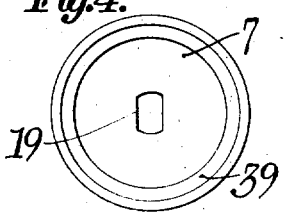
INVENTOR:
Carl C. Fuerst,
BY
ATTORNEYS.

Patented Feb. 4, 1936

2,029,918

UNITED STATES PATENT OFFICE 2,029,918

CAMERA CONSTRUCTION

Carl C. Fuerst, Rochester, N. Y., assignor to Eastman Kodak Company, Rochester, N. Y., a corporation of New York Original application April 25, 1934, Serial No. 722,347. Divided and this application May 7, 1935, Serial No. 20,127

7 Claims. (Cl. 95—32)

This invention relates to photography and more particularly to roll film cameras. One object of my invention is to provide a suitable winding key construction for roll film cameras which is particularly adapted for use in cameras having curved wall construction. Another object of my invention is to provide a film winding key light trapping structure which is particularly adapted for cameras made of moldable, cast or die-cast materials. Another object of my invention is to provide a camera with a camera back removable from the camera body with a suitable seat for a winding key and to provide a light-tight connection beneath the seat between the camera body and the removable back. Still another object of my invention is to provide a winding key having a shape adapted to cooperate with the shape of the camera body and the removable back for the camera body and other objects will appear from the following specification, the novel features being particularly pointed out in the claims at the end thereof.

This application is a division of my copending application Serial No. 722,347 filed April 25, 1934, for winding key for cameras.

Coming now to the drawing wherein like reference characters denote like parts throughout;

Fig. 1 is a side elevation of a folded camera having a winding key constructed in accordance with and embodying a preferred form of my invention;

Fig. 2 is an enlarged fragmentary sectional view taken on the line 2—2 of Fig. 1;

Fig. 3 is an enlarged fragmentary end elevation of the winding mechanism with said parts removed;

Fig. 4 is a plan view of the inside of the winding knob;

Fig. 5 is a plan view of the spring pawl removed from the winding mechanism;

Fig. 6 is a fragmentary detail perspective view of a portion of the camera wall showing a portion of a slot which is engaged by a flange on the camera cover;

Fig. 7 is a sectional view through a modified form of film winding key; and

Fig. 8 is a plan view of the ratchet washer used in the modified form of my invention shown in Fig. 7.

As an example of my invention I have shown it as applied to a simple type of camera in which there is a camera body 1 which has a cover 2 removable from the body along the line 3, there being a flange 4 carried by the cover projecting into a corresponding groove in the camera body to make a light-tight joint therewith.

The camera body may be provided with a front board 5 carrying a lens cell 6, this front board being moved from the closed position shown in Fig. 1 to an opened or operative position as well known in the art.

The camera body 1 may be provided with a take-up spool chamber 45 and a supply spool chamber 46, between which there is the usual passageway 47, through which the film may pass behind an exposure frame 48 which holds the film in position for exposure.

The camera body 1 is provided with a winding mechanism which may consist of a winding knob 7 on the outside of the camera, this knob being attached by means of a screw 8 to a film winding shaft 9.

As is customary this shaft has some configuration adapted to engage a film spool. In the present instance this configuration consists of a web 10 adapted to extend into a slot 11 in the spool trunnion 12. This spool may be of a well known type in which the hub 13 carries flanges 14 and the spool trunnion 12 extends out beyond the flanges.

The winding key or knob 7 is arranged so that it may turn in only one direction. This is accomplished by providing, as indicated in Fig. 5, a pair of spring pawls 15 which are carried by a spring washer 16 having a non-round opening 17. This non-round opening engages the non-round end 18 of the film winding shaft 10 as is best shown in Fig. 3.

Referring to Fig. 4 it will be seen that the winding key 7 is also provided with a non-round opening 19 of the same configuration as the end of the shaft 18. When the openings 19 and 17 in the winding knob and spring washer are placed over the end 18 of the shaft, they may be held in this position by means of the screw 8 which is threaded to engage the threaded opening 20 in the film winding shaft 9. The spring pawls 15 are adapted to engage a ratchet washer best shown in Fig. 3 at 21. This washer is provided with teeth 22 about its periphery and is also provided with a central hub 23 adapted to engage the winding key shaft 9.

From Fig. 2 it will be noted that the winding key shaft is provided with an outwardly projecting flange 24 adapted to be received in a groove 25 which is formed in the camera and adapted to be held in this groove by means of the ratchet washer 21 which as shown in Fig. 3 may be definitely fastened to the camera body as by means of screws 26.

It will readily be seen that with this construction the winding key can be assembled from the outside of the camera by merely taking out the screws 8 and 26, the winding key shaft 9 will then pull directly out of the camera.

An important feature of my invention is the construction of the winding key which makes the camera entirely light-tight. As indicated in Fig. 6 the camera body 1 may be provided with a groove 30 which extends entirely around the camera body 1 so that it may be engaged by a flange 4 extending entirely around the camera back 2. The flange 4 on the camera back 2 may be notched as indicated in Fig. 1 at 33 to pass over the winding key shaft 9. However, at this point the light is well obstructed by the construction used. The camera body 1 is provided with a circular forming 34 which is preferably annular in shape and which is provided at 35 with an annular rim extending around its periphery as best shown in Fig. 3. Thus not only does the annular forming 34 lie over a portion of the camera back 2 but as shown in Fig. 2 there are inter-engaging walls 36 on the camera back end 37 of the forming which make a perfectly light-tight joint.

It should also be noticed that the winding knob 7 is provided with a downwardly extending flange 38 which is provided with a groove 39 adapted to lie close to or actually engage the upwardly extending annular flange 35 on the forming 34. This not only forms a run-way or track for guiding the winding key and preventing it from being bent out of shape but it also makes a light-tight joint for the hollow-box-like receptacle 40 which exists between the flange forming 34 and the winding key 7. Thus the parts of the winding mechanism, that is, the spring pawls 15 and the ratchet washer 21 are all tightly enclosed.

The construction of the entire winding key has been carefully designed to prevent light leakage down along the film winding shaft 9. The screw head 8 entirely lies over the joint between the winding key and the shaft 9 and in addition the flange 24 by projecting into the recess in the camera likewise prevents light from leaking through around the outside of the post.

Where the cost of a winding key must be reduced to a minimum, the structure shown as modified forms in Figs. 7 and 8 may be employed. In these views the camera wall 50 is provided with an annular flange 51 forming an opening into which the ratchet washer 52 may be placed. This washer has ratchet teeth 53 and may be held against turning by means of the lugs 54 which are struck from the metal of the washer 52 and are bent so that they extend down into apertures 55 formed in the camera wall 50. The spring pawl used in this construction may be exactly the same as that shown in Fig. 5.

The winding knob 56 may also be like the winding knob above described, the function of the flange 57 being identical with the function of the flange 38.

As will be seen from Fig. 2, the camera body 1 and the removable back 2 have a wall which is curved in cross section. This is useful in cameras made of moldable or castable materials since it affords an opportunity to reenforce or strengthen an edge of a camera without materially increasing the size of the camera by sinking a winding key web 10 into the wall of the camera body 1 and by permitting the spool trunnion 12 to extend into the wall to engage the winding key web 10, a very compact camera can be made. As it is difficult to provide suitable light-tight connections in the wall which is curved in cross section, the flat forming 34 provides a seat for the winding key mechanism and in addition by extending out a portion 37 of this seat and by having it cooperate with a plane surface 36 in the camera back 2, these parallel walls form a suitable light-tight connection between the walls of the camera back and the camera body which, as above explained, are curved in a cross section.

While I have illustrated and described a preferred form of my invention, I consider as within the scope of my invention all such forms as may come within the scope of the appended claims.

What I claim as new and desire to secure by Letters Patent of the United States is:

1. In a film winding mechanism for cameras, the combination with a camera body, a removable back adapted to cover an opening in the camera body, spool chambers and an exposure frame carried by the camera, a forming carried by the camera and supporting a spool winding shaft extending through an aperture therein, a flange and slot connection between the camera back and body lying partially beneath the forming and making a light-tight connection, a winding knob mounted on the shaft and having an annular flange lying close to said forming and enclosing a pawl and ratchet adapted to prevent rotation of the knob and spool winding shaft in one direction.

2. In a film winding mechanism for cameras, the combination with a camera body, a removable back adapted to cover an opening in the camera body, spool chambers and an exposure frame carried by the camera, a forming carried by the camera and supporting a spool winding shaft extending through an aperture therein, a flange and slot connection between the camera back and body lying partially beneath the annular forming and making a light-tight connection, a winding knob mounted on the shaft and having an annular flange lying close to said forming, a ratchet carrying washer and a pawl adapted to engage said washer, one fixedly attached to the camera and the other fixedly attached to the spool winding shaft for preventing the latter from turning in one direction.

3. In a film winding mechanism for cameras including a camera body and a separable back having interengaging flange and groove connections, the combination with an annular, flanged camera part having a central aperture and projection over the grooved part of the camera casing, of a film winding shaft extending through said aperture, a winding disk carried by the shaft, an annular flange on said disk projecting toward said camera flange and provided with a groove to partially enclose the flanged camera part forming a light-tight closure, cooperating elements carried by the film winding shaft and the camera adapted to prevent movement of the shaft in one direction, said elements being totally enclosed in said light-tight closure, said light-tight closure extending over a portion of the light-tight interengaging flange and groove connection between the camera back and body.

4. In a film winding mechanism for cameras including a camera body and a separable back having interengaging flanges forming a light-tight connection therebetween, the combination with a camera part including an exterior wall curved in cross section in at least one direction, of a flat forming on said curved wall having an aperture therein, a film winding shaft extending through said aperture, a winding disk carried by the shaft, said disk lying close to the flat forming in the curved camera wall, cooperating elements between the winding disk and flat forming for preventing the shaft from turning in one direction, said flat forming extending entirely around the winding key shaft and extending a material distance over the interengaging flanges forming light-tight connections between the camera body and its separable back.

5. In a film winding mechanism for cameras including a camera body and a separable back having interengaging flanges forming a light-tight connection therebetween, the combination with a camera part including an exterior wall curved in cross section in at least one direction, of a flat forming on said curved wall having an aperture therein, a film winding shaft extending through said aperture, a winding disk carried by the shaft, said disk lying close to the flat forming in the curved camera wall, cooperating elements between the winding disk and flat forming for preventing the shaft from turning in one direction, said flat forming extending entirely around the winding key shaft and extending a material distance over the interengaging flanges forming light-tight connections between the camera body and its separable back including spaced parallel walls, the edges of said walls having a configuration on the camera body complementary in shape to a wall configuration on the camera back adapted to form a light-tight joint therebetween.

6. In a film winding mechanism for cameras including a camera body and a separable back having interengaging flanges forming a light-tight connection therebetween, the combination with a camera part including an exterior wall curved in cross section in at least one direction, of a flat forming on said curved wall having an aperture therein, a film winding shaft extending through said aperture, a winding disk carried by the shaft, said disk lying close to the flat forming in the curved camera wall, cooperating elements between the winding disk and flat forming for preventing the shaft from turning in one direction, said flat forming extending entirely around the winding key shaft and extending a material distance over the interengaging flanges forming light-tight connections between the camera body and its separable back, including spaced parallel walls of semi-circular shape on the camera body forming a flanged surface adapted to engage a complementary shaped flanged surface on the camera back to prevent light from entering therebetween.

7. In a film winding mechanism for cameras including a camera body and a separable back having interengaging flanges forming a light-tight connection therebetween, the combination with a camera part including an exterior wall curved in cross section in at least one direction, of a flat forming on said curved wall having an aperture therein, a film winding shaft extending through said aperture, a winding disk carried by the shaft, said disk lying close to the flat forming in the curved camera wall, cooperating elements between the winding disk and flat forming for preventing the shaft from turning in one direction, said flat forming extending entirely around the winding key shaft and extending a material distance over the interengaging flanges forming light-tight connections between the camera body and its separable back, including spaced parallel walls of semi-circular shape on the camera body forming a flanged surface adapted to engage a complementary shaped flanged surface on the camera back to prevent light from entering therebetween, the two flanged surfaces including parallel flanges of a shape and size to cause portions of one flange to overlie portions of the other flange, whereby the flat forming on the curved camera wall includes a seat for the winding disk and a light-tight joint formed in the seat beneath the winding knob.

CARL C. FUERST.